United States Patent [19]

Harris et al.

[11] 4,020,030
[45] Apr. 26, 1977

[54] REACTION PRODUCTS OF EPOXY RESINS, ORGANIC SULFIDES AND PROTIC ACIDS

[75] Inventors: Robert F. Harris; Nancy B. Tefertiller, both of Midland, Mich.

[73] Assignee: The Dow Chemical Company, Midland, Mich.

[22] Filed: Feb. 24, 1975

[21] Appl. No.: 552,519

[52] U.S. Cl. .................... 260/29.2 EP; 260/18 EP; 260/29.3; 260/29.4 R; 260/47 EP; 260/49; 260/59 EP; 260/78.3 R; 260/79; 260/78.41; 260/831; 260/834; 260/836; 260/837 R; 428/418

[51] Int. Cl.² ................ C08G 51/24; C08G 30/04

[58] Field of Search .......... 260/47 EP, 49, 29.2 EP, 260/79, 18, 29.3, 29.4, 78.4 EP; 204/181; 204/59

[56] References Cited

UNITED STATES PATENTS

| | | | |
|---|---|---|---|
| 3,793,278 | 2/1974 | De Bona | 260/29.2 EP |
| 3,844,998 | 10/1974 | Jeffery | 260/29.4 R |

FOREIGN PATENTS OR APPLICATIONS

| | | | |
|---|---|---|---|
| 2,261,804 | 6/1973 | Germany | 260/29.2 |

*Primary Examiner*—Theodore E. Pertilla
*Attorney, Agent, or Firm*—L. Wayne White

[57] ABSTRACT

Water soluble or water dispersible reaction products are produced by reacting (1) an epoxy resin having an epoxy equivalent weight of at least about 500 with (2) an organic sulfide in the presence of (3) a protic acid having a dissociation constant greater than $1 \times 10^{-5}$. Such reaction products can be used alone as coating compositions or can be blended with various resins which will react with pendent hydroxy groups on the above reaction product upon heating and thereby form a cross-linked product. The melamine resins are examples of suitable such "cross-linkers".

27 Claims, No Drawings

REACTION PRODUCTS OF EPOXY RESINS, ORGANIC SULFIDES AND PROTIC ACIDS

BACKGROUND OF THE INVENTION

Field of the invention: This invention is related to water soluble or water dispersible reaction products and their use as coating compositions.

Description of the prior art: The reaction of monomeric alkylene oxides with organic sulfides (i.e. thioethers) in the presence of various acids is well known. Such reactions are described, for example, in U.S. Pat. Nos. 3,159,682, 3,184,477, 3,538,132 and references cited therein. The reaction of an epoxy resin with an organic sulfide in the presence of an acid was more recently described by DeBona in U.S. Pat. No. 3,793,278.

In U.S. Pat. No. 3,793,278 epoxy resins of relatively low epoxy equivalent weight (EEW) were reacted in a substantially organic medium with certain organic sulfides in the presence of an acid having a dissociation constant greater than $1 \times 10^{-5}$ to thus form a "quaternary sulfonium salt group — containing resin" which was subsequently dispersed in water. The patentee states that such aqueous dispersions are useful as coating compositions and are particularly useful as electrodepositable coating compositions which deposit upon a cathode. The patentee states that his reaction products can be characterized as "a water-containing medium containing an ungelled water-dispersible epoxy resin having at least one 1,2-epoxy group per average molecule, and chemically-bound quaternary sulfonium base salts". Such products are achieved as noted above by reacting low molecular weight epoxy resins (e.g. those having an EEW of up to about 300) with a sulfide in the presence of certain acids (specifically lactic acid). The reaction between such components occurred at temperatures of from 70° to 110° C, normally in an organic solvent. The ratio of reactants in the process was chosen by the patentee such that there was at least one equivalent of acid per equivalent of sulfide. The ratio of sulfide to epoxy group in the epoxy resin was said to be variable so long as the final resin contained an average of at least one epoxy group per molecule. These products are more fully described in a U.S. Pat. application Ser. No. 217,278 by Wismer and Bosso entitled "Epoxy Compositions" filed Jan. 12, 1972 (see German Pat. application No. 2,261,804, filed Dec. 16, 1972). The thermal curability of sulfonium compounds alluded to by the patentee in U.S. Pat. No. 3,793,278 is an important property which was demonstrated by Hatch in U.S. Pat. No. 3,544,499. Electrodeposition of water-soluble mono-sulfoniums was taught in U.S. Pat. No. 3,852,174 and the electrodeposition of water-soluble polysulfonium compounds was shown by U.S. Pat. No. 3,697,398.

SUMMARY OF THE INVENTION

We have discovered a novel class of water-soluble or water-dispersible reaction products. Such products are produced by reacting (1) an epoxy resin bearing a plurality of vicinal epoxy groups and having an epoxy equivalent weight (EEW) of at least about 500; (2) an organic sulfide; and (3) a protic acid having a dissociation constant greater than $1 \times 10^{-5}$. The instant reaction products are extremely useful as water-based coating compositions which can be thermally cured or can be cured by reaction with conventional "heat-convertible" resins which are reactive with hydroxyl groups at elevated temperatures (e.g., urea/formaldehyde resins, phenol/formaldehyde resins, etc.). The cure rate of such coating compositions is accelerated by the presence of small but catalytic amounts of a protic acid.

The advantages of the instant reaction products over the products described in U.S. Pat. No. 3,793,278 by DeBona are several. Such advantages include: better colloidal stability in aqueous media, better coating properties, and much lower toxicity. These advantages are very substantial from a commercial standpoint and were not suggested by the prior art.

DETAILED DESCRIPTION OF THE INVENTION

The Epoxy Reactants:

Epoxy resins constitute a known class of compounds, each member of which bears a plurality of pendent or terminal 1,2-epoxy groups (i.e. vicinal epoxy groups). Any member of this known group is suitable for use herein so long as the selected epoxy resin has an epoxy equivalent weight of at least about 500 (and preferably from about 500 to about 2000). Suitable such epoxy groups are described, for example, in U.S. Pat. Nos. 3,477,990 and 3,793,278, Canadian Pat. 893,191, German Pat. application No. 2,206,218, and the text "Handbook of Epoxy Resins" by H. Lee and K. Neville, McGraw Hill, New York (1967). The preferred classes of epoxy resins for use herein correspond to formulas I or II below:

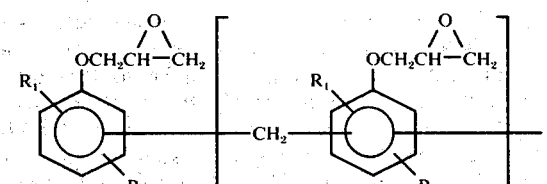

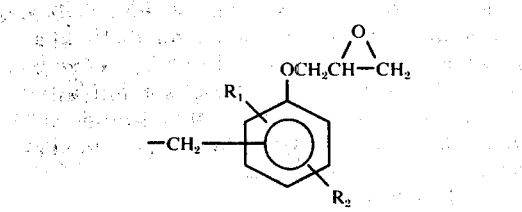

I wherein $R_1$ and $R_2$ are hydrogen, lower alkyl of 1 to 6 carbon atoms, chlorine or bromine, and m has an average numerical value of up to about 12; or

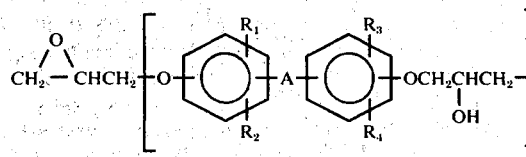

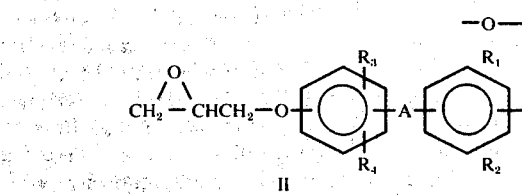

II wherein $R_1$, $R_2$, $R_3$ and $R_4$ are each independently hydrogen, lower alkyl of 1 to 6 carbon atoms, chlorine or bromine; and —A— is —S—, —O—, —S—S,

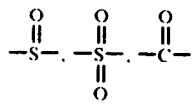

or a divalent saturated hydrocarbon of from 1 to 6 carbon atoms (e.g. methylene, ethylene, isopropylidene, cyclohexylidene, etc.); and n has an average numerical value of up to about 12.

In formulas I and II, $R_1$–$R_4$ are each preferably hydrogen, and, A is preferably isopropylidene.

The Sulfide Reactants:

The sulfide reactants here used are organic sulfides which are sometimes referred to as thioethers. The organic sulfides are likewise a well known class of compounds having many members. Any member of this group can be used which reacts with epoxy groups and which does not contain interfering groups. Preferred sulfides are those corresponding to the formula $R_5$—S—$R_6$ wherein $R_5$ and $R_6$ are each independently hydrocarbyl or inertly-substituted hydrocarbyl groups of from 1 to about 24 carbon atoms, or they are joined to form a 5— or 6-membered saturated heterocycle with the sulfur atom being one member of the heterocyclic ring and the remaining members of the ring are carbon or, the heterocyclic ring may optionally contain one non-adjacent atom of oxygen, relative to the sulfur atom in the ring. More preferably, $R_5$ and $R_6$ are alkyl or hydroxyalkyl of from 1 to about 20 (most preferably 1 to 4) carbon atoms. Examples of suitable such sulfides include dimethylsulfide, diethylsulfide, dibutylsulfide, dioctylsulfide, methyldodecylsulfide, methyloctadecylsulfide, ethyl phenyl sulfide, butyl tolyl sulfide, diallyl sulfide, cyclohexyl methyl sulfide, methylthioethanol, ethylthioethanol, butylthioethanol, thiodiethanol, bis(2-hydroxypropyl)sulfide, bis(2-hydroxybutyl)sulfide, bis(2-chloroethyl)sulfide, tetrahydrothiophene, p-thioxane and the like.

The Acid Reactants:

The acids used herein are protic acids having a dissociation constant of at least about $1 \times 10^{-5}$. Such acids are alternatively referred to as Bronsted acids. Such acids include both organic and inorganic acids having one or more acidic protons. The preferred acids are organic monocarboxylic from 1 to about 24 carbon atoms. More preferred are organic monocarboxylic acids of from 1 to 4 carbon atoms and acetic acid is the most preferred acid for use herein. Suitable such acids therefore include, for example, alkanoic acids (e.g. formic acid, acetic acid, propionic acid, lactic acid, butyric acid, caprylic acid, lauric acid, stearic acid, and the like), alkenoic acids (e.g. acrylic acid, methacrylic acid, oleic acid, linolenic acid, and the like), aromatic acids (e.g. benzoic acid, p-toluene sulfonic acid, butylbenzoic acid, napthanoic acid, and the like) and other such organic acids including mixtures thereof (e.g. tall oil acids, linseed oil acids, and the like). Polycarboxylic acids are likewise suitable, and in fact are preferable in many instances since they function as cross-linking agents for the epoxy resin/ sulfide/acid reaction products. Examples of such polycarboxylic acids include: oxalic, malonic, adipic, succinic, itaconic, citric, polyacrylic and polymethacrylic acids, and the like. Inorganic acids are also suitable and include, for example, hydrochloric acid, hydrobromic acid, sulfuric acid, phosphoric acid, and the like. Mixtures of inorganic and organic acids can be also used herein. We have observed that the best acids for use herein are those in which the anion portion of the acid is relatively non-nucleophilic.

Ratio of Reactants

The instant reaction produces sulfonium groups by the reaction of the sulfide and acid with the epoxy group on the epoxy resin. The stoichiometry of this reaction requires one equivalent of acid and one equivalent of sulfide per epoxy group to be converted to the sulfonium moiety. Thus, the ratio of sulfide to acid can be varied, but normally we prefer to use at least one equivalent of sulfide per equivalent of acid. Rates of reaction abd/or subsequent coating properties are enhanced by the use of excess sulfide.

The ratio of sulfide to epoxy group in the epoxy resin can likewise be varied so long as at least a portion of the epoxy groups on the epoxy resin are converted to the sulfonium groups. We prefer to use a ratio of at least about 0.7 equivalents of sulfide and at least 0.7 equivalents of acid per epoxy group in the epoxy resin. Compounds prepared using the above ratio of reactants have superior properties and are thus preferred.

Process Conditions

The reaction is conducted by contacting the epoxy resin, organic sulfide and acid at a temperature sufficient to cause the epoxy group(s) to be ring-opened by the sulfide and acid and at a temperature below the thermal decomposition temperature of the reactants or products. The procedure described by DeBona can be used, but better results (i.e. higher conversions of epoxy group(s) to sulfonium groups) are obtained by using either Procedure A or Procedure B below.

Procedure A

In this procedure, the reactants are blended in water (optionally in the presence of a dispersing agent and/or organic cosolvent) and the reaction mixture warmed at a temperature of from about 35° to about 90° C (preferably from about 60° to about 85° C) until the reaction is substantially complete. This reaction is generally complete in less than 6 hours, a fact determined by titration for unreacted acid. The optional dispersing agent can be any one of the conventional dispersing agents (e.g. non-ionic surfactants, soaps, etc.) but is preferably the sulfonium reaction product from a previous run. Optional cosolvents are water-miscible organic compounds which help solvate the instant reactants in the aqueous reaction medium. Examples of such cosolvents include lower alkanols of 1 to 4 carbons (e.g. methanol, ethanol, propanol and butanol), ketones (e.g. acetone, methyl ethyl ketone, etc.), alkoxyalkanols (e.g. Dowanols) and the like.

Procedure B

The epoxy resin is reduced to a stirrable viscosity by warming (or optionally by adding all or part of the corresponding sulfide) and mixed with the sulfide and acid reactants in water. The reaction mixture is maintained at a temperature of from about 60° to about 100°

C (preferably from about 70° to about 85° C) until the reaction is substantially complete. In this procedure, the amount of water is important and varies from about 5 to about 50 (preferably from about 10 to about 20) moles of water per theoretical sulfonium moiety in the final product, based on reactants charged. Reaction times in this procedure of up to about 12 hours have been used but the reaction is normally complete in less than 6 hours. Procedure B is presently preferred over Procedure A when the sulfide is highly water soluble (e.g. thiodiethanol).

In both Procedures A and B, the water appears to stabilize or preserve the sulfonium groups at elevated temperatures (e.g. at the preferred reaction temperatures in Procedures A and B).

The reaction products from Procedures A and B are essentially the same.

Each of Procedures A and B are considered to be novel processes. In Procedures A and B there is a higher conversion of sulfide to sulfonium than in the DeBona process. Additionally, and this is important from a commercial standpoint, the reaction products from Procedure A are obtained directly as an aqueous solution or aqueous dispersion thereof which can be used as they are produced as coating compositions. Similarly, the products obtained by Procedure B are obtained as warm, viscous liquids which can be easily diluted with water to produce coating compositions of desired solids concentration without a separate dispersion step. DeBona's claimed procedure requires a separate step to disperse his products, a step which could be very troublesome when dealing with high molecular weight resinous products. Indeed, entire books have been written on emulsifiers and emulsification techniques.

Utility

The instant reaction products are useful coating compositions. They are normally applied as an aqueous solution or an aqueous dispersion thereof to the substrate and subsequently thermally cured. Convenient cure rates have been observed at temperatures of from about 175° to about 225° C, but higher or lower temperatures could be used at the convenience of the user. Bronsted acids catalyze the cure rate when used in small but catalytic amounts (e.g. from about 0.1 to about 10 weight percent, based on the weight of the reaction product). Various additives can also be included in the coating compositions. For example, we find it convenient to include a water-compatible, thermally-curable resin which will react with the hydroxy groups on the above reaction products and thus effect more extensive cross-linking. Bronsted acids also catalyze this cross-linking reaction. Suitable such resins include urea/formaldehyde resins, imino urea/formaldehyde resins, melamine/formaldehyde resins, phenol/formaldehyde resins, and the like. Such resins are normally used in amounts of from about 5 to about 50 weight percent, based on the weight of the epoxy resin-/organic sulfide/protic acid reaction product and are preferably used in amounts of from about 10 to about 30 weight percent. Other cross-linking agents can also be used in addition to or in place of such water-compatible thermally-curable resins. For example, a polycarboxylic acid can be used as the acid in forming the instant epoxy resin/sulfide/acid reaction products and the polyanion, thus formed, is an inherent cross-linking agent at elevated temperatures. Alternatively, such water-compatible polycarboxylic acids can be specifically added to the epoxy resin/sulfide/acid reaction products as a cross-linking agent(s). Examples of suitable such polycarboxylic acids include oxalic, malonic, maleic, succinic, adipic, citric, itaconic, isophthalic, terephthalic, polyacrylic and polymethyacrylic acids, copolymers of acrylic and/or methacrylic acids with ($C_1$ to $C_4$) alkyl acrylates and/or methacrylates, carboxylated polybutadiene, and the like. The reaction of such polycarboxylic acids (or polycarboxylates) with the instant epoxy resin/sulfide/acid reaction products produces polyester groups at the cross-linking sites. When cyclic sulfides are used in preparing the instant products, the cyclic sulfonium groups react with carboxylic acids to give extended and/or cross-linked ring-opened products having sulfide and ester linkages. Such extended and/or cross-linked products are novel compositions. Inversely, the instant epoxy resin/sulfide/acid reaction products can be used as cross-linking agents for water-compatible carboxy-containing polymers in a like manner.

Other conventional additives can likewise be included in the instant coating compositions, such as leveling agents, pigments, fillers, cosolvents, foam control agents, etc.

The following experimental data will further illustrate the invention.

EXPERIMENT 1

The epoxy resin used in this particular experiment was the solid reaction product of bisphenol A with epichlorohydrin corresponding to formula II above wherein $R_1$–$R_4$ are each hydrogen, A isopropylidene, and n is an average of 2.5. This product is sold by The Dow Chemical Company under the trade name DER 661. DER 661 (525 g, 1.0 epoxy equivalents), water (940 g), and dimethylsulfide (186 g, 3.0 mol) were charged to a reaction flask equipped with a mechanical stirrer, a thermometer, a dropping funnel and a condenser. The reaction mixture was heated to and maintained at 35° C while glacial acetic acid (60 g, 1.0 mol) was added dropwise over a period of two hours. The reaction mixture was maintained at 35° C and monitored by acid consumption. At the end of the two hour addition period mentioned above, 16 percent of the acid had been consumed; after 10 hours, 87 percent of the acid was consumed; and after 17 hours 93 percent of the acid had been consumed. The reaction product thus produced was dialyzed using a cellulose acetate membrane for a period of about 24 hours and the dialyzed solution containing the product was concentrated under vacuum at about 35° C. The product (1223 g) was thus obtained as a colorless solution having about 31 percent solids content and a pH of 7. The product was identified by its nuclear magnetic resonance (NMR) spectrum and by polarography techniques. Such data indicated that the preponderance of the sulfide and acid consumed were present as sulfonium groups on the molecule. The sulfonium reaction product thus corresponds to the general formula

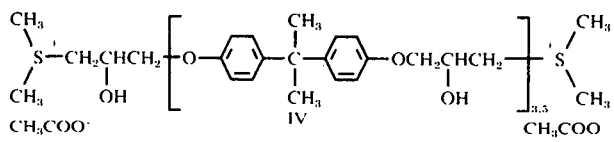

EXPERIMENT 2

DER 661 (2625 g, 5.0 epoxy equivalents), water (4125 g) and ethylthioethanol (467.5 g, 4.5 mol) were charged to a reaction flask equipped with a mechanical stirrer, a thermometer, a dropping funnel, and a condenser. The reaction mixture was heated to and maintained at 80° C while a solution of acetic acid (270 g, 4.5 mol) and water (875 g) was added dropwise over a period of 35 minutes. The reaction mixture was maintained at 80° C and the reaction monitored by acid consumption. At the end of the addition period, 37 percent of the acid was consumed; after 1 hour, 76 percent of the acid was consumed; after 2 hours, 88 percent of the acid was consumed; and after 3 hours, 93 percent of the acid was consumed. The reaction product was used to produce heat curable coatings having good physical properties without purification or other treatment.

EXPERIMENTS 3–10

Using substantially the same procedure as in Experiments 1 and 2 except for the reactants, a series of products were produced which corresponded to the formula

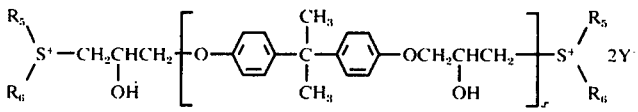

wherein the variables have the values assigned in Table I.

TABLE I

| Ex. | $R_5$ | $R_6$ | Avg. X | $Y^-$ |
|---|---|---|---|---|
| 3 | $CH_3$ | $CH_3$ | 3.5 | $HCOO^-$ |
| 4 | $CH_3$ | $CH_3$ | 3.5 | $CH_3SO_3^-$ |
| 5 | —$CH_2CH_2CH_2CH_2$— | | 3.5 | $CH_3COO^-$ |
| 6 | $CH_3$ | $CH_3$ | 3.5 | $HOCH_2CH_2SO_3^-$ |
| 7 | $HOC_2H_4$ | $HOC_2H_4$ | 3.5 | $CH_3COO^-$ |
| 8 | $CH_3$ | $CH_3$ | 6.3 | $CH_3COO^-$ |
| 9 | $HOC_2H_4$ | $HOC_2H_4$ | 6.3 | $CH_3COO^-$ |
| 10 | $C_2H_5$ | $HOC_2H_4$ | 11.5 | $CH_3COO^-$ |

EXAMPLE 11

DER 661 (105 g, 0.20 epoxy equivalents) was charged to a reaction vessel and heated at 85°–90° C until liquid and the temperature of the melt lowered to 72° C. To this was added, with stirring, a solution of thiodiethanol (44 g, 0.36 mol), acetic acid (10.8 g, 0.18 mol) and water (32.4 g, 1.8 mol) over a time period of 54 minutes. During the addition the temperature was maintained at about 70° C. The progress of the reaction was again monitored by titration for residual acid and after 94 percent of the acid had been consumed, the reaction mixture was diluted with water to a 50 percent solids concentration for use as a coating composition. The 50 percent solids solution was a clear yellow, low viscosity liquid at room temperature. Analysis of the reaction product by conductometric and $C^{13}$ NMR techniques indicated that the preponderance of the sulfide and acid consumed were present in the final product as sulfonium moieties.

Essentially equivalent results were obtained in a series of experiments using essentially the same procedure set forth above but with different acids and difference epoxy resins. In this series of experiments, trifluoroacetic acid, hydroxyacetic acid, acrylic acid, lactic acid, phosphoric acid, and a equal mixture of acetic and phosphoric acid were each used with excellent results. In addition epoxy resins as defined in structure II where n is equal to 5.3 and to 11.5 were also employed.

EXAMPLE 12

The procedure of Example 11 was followed in this experiment except the ratio of reactants was changed. Here, Der 661 (210 g, 0.40 epoxy equivalents) was reacted with thiodiethanol (12.2 g, 0.1 mol), acetic acid (6.0 g, 0.10 mol) and water (18.0 g, 1.0 mol); 95 percent of the acid was reacted after a 3.2 hour period. The product was thus obtained as a concentrate and was easily diluted while warm to a 50 percent solids level by adding water with stirring. The 50 percent solids material was thus obtained as a stable white dispersion (equal to or less than $2\mu$ in particle size).

Coating Applications

The reaction products of Examples 1–12 above were cast as aqueous solutions or aqueous dispersions on steel or aluminum panels and thermally cured at a temperature of from about 175° to about 225° C for a period of 2 to 30 minutes. The coatings thus obtained were adherent and of good appearance.

The appearance and physical properties of the coatings were even further improved when the instant products were formulated with a water-compatible, thermally curable resin reactive with hydroxyl groups (e.g. melamine/formaldehyde resin, etc.). A representative formulation is: 100 parts of a 50 weight percent solution in water of the reaction product from Example 11, for example, and 32 parts of water, 5.8 parts of 10 percent phosphoric acid in water, and 1.8 parts of a conventional flow or leveling agent (e.g. Dow Corning Paint Additive 11 or 14) and 7.6 parts of hexamethoxymethylmelamine (sold under the trade name of Cymel 303 by American Cyanamid). This composition was coated on an aluminum panel using a number 15 Meyer rod and cured for 10 minutes at about 205° C. The coating thus obtained was a durable, strongly adherent coating having an excellent appearance as well as having excellent solvent and water resistance.

Similar formulations using the instant epoxy resin/organic sulfide/acid reaction products in water were obtained when blended with 10–50 weight percent of urea/formaldehyde resins, (such as Beetle 65 and Beetle 80, sold by American Cyanamid). It was noted that the cure rate of formulations was accelerated by the presence of a catalytic amount of acid (e.g. phosphoric acid, polyphosphoric acid, isethionic acid, p-toluenesulfonic acid, sulfuric acid, cycloamic acid, etc.) or amine salts of acids (e.g. diammonium hydrogen phosphate, ammonium dihydrogen phosphate, ammonium chloride, ammonium p-toluenesulfonate, etc.).

Other additives such as pigments, fillers, cosolvents, foam control agents, etc. could likewise be included in the water base formulation if desired.

EXAMPLE 13

In this experiment, a reaction product of DER 661, tetrahydrothiophene and acetic acid was prepared according to the procedure in Example 2, and diluted with water to a 14 percent solids concentration. A 10 g aliquot of the resulting solution (2.08 milliequivalents of S) was mixed with 1.36 g of a 50 percent citric acid solution (10.62 milliequivalents of COOH) in water. The resulting solution was cast as a film on a Bonderite 37 steel panel and cured for 10 minutes at 200° C. The coating thus produced was a smooth, adherent, crosslinked film having good solvent resistance. The film was not affected when a cotton swab soaked in methyl ethyl ketone was rubbed across the surface of the cured film 100 times under a 2 pound load. Additionally, the film did not delaminate or blush when the coated panel was soaked in water for 3 hours.

Good film properties are also obtained when citric acid is replaced in the above formulation with itaconic acid, maleic acid, copolymers of butyl acrylate, methyl methacrylate and acrylic acid (a 35/35/30 monomer weight percent polymer), and the like.

The above Examples are meant to be illustrative and not limiting. Other embodiments of the invention will be readily apparent to those skilled in the art.

What is claimed is:

1. A water-soluble or water-dispersible reaction product of (1) an epoxy resin bearing a plurality of vicinal epoxy groups and having an epoxy equivalent weight (EEW) of at least about 500; (2) an organic sulfide; and (3) a protic acid having a dissociation constant of at least $1 \times 10^{-5}$.

2. The product defined by claim 1 wherein (1) is a resin corresponding to the formula

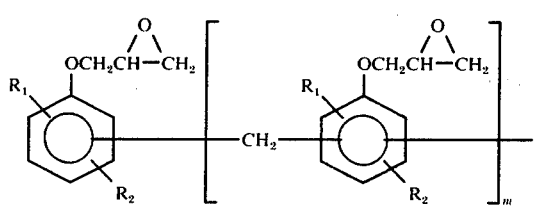

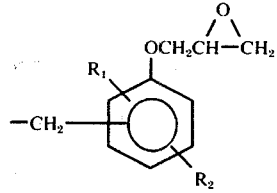

wherein $R_1$ and $R_2$ are hydrogen, lower alkyl, chlorine or bromine, and m has an average numerical value of up to about 12; or

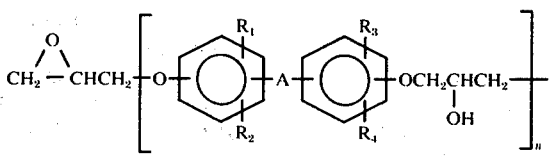

wherein $R_1$, $R_2$, $R_3$ and $R_4$ are each independently hydrogen, lower alkyl, chlorine or bromine; and —A— is —S—, —O—, —S-S—,

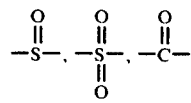

or a divalent saturated hydrocarbon of from 1 to 6 carbon atoms; and n has an average numerical value of up to about 12.

3. The product defined by claim 2 wherein (1) has an epoxy equivalent weight of from about 500 to about 2,000.

4. The product defined by claim 3 wherein $R_1$, $R_2$, $R_3$ and $R_4$ are each hydrogen and —A— is isopropylidene.

5. The product defined by claim 1 wherein (2) is an organic sulfide corresponding to the formula $R_5$—S—$R_6$, wherein $R_5$ and $R_6$ are each independently hydrocarbyl or inertly-substituted hydrocarbyl groups of from 1 to about 24 carbon atoms, or, $R_5$ and $R_6$ are joined to form a 5- or 6-membered saturated heterocyclic ring with the sulfur atom being one member of said ring and the remaining members being carbon or carbon and one non-adjacent atom of oxygen, relative to the sulfur atom in the ring.

6. The product defined by claim 5 wherein $R_5$ and $R_6$ are each alkyl or hydroxy alkyl of from 1 to about 20 carbon atoms.

7. The product defined by claim 6 wherein $R_5$ and $R_6$ are alkyl or hydroxyalkyl of from 1 to 4 carbons.

8. The product defined by claim 1 wherein (3) is an organic monocarboxylic acid of from 1 to about 24 carbon atoms.

9. The product defined by claim 8 wherein (3) is an organic monocarboxylic acid of from 1 to 4 carbon atoms.

10. The product defined by claim 9 wherein (3) is acetic acid.

11. The product defined by claim 1 wherein (3) is an organic polycarboxylic acid.

12. The product defined by claim 1 wherein (3) is an inorganic acid.

13. The product defined by claim 1 wherein there are at least about 0.7 equivalents of (2) and at least about 0.7 equivalents of (3) per vicinal epoxy group in (1).

14. The product defined by claim 1 wherein (2) is a organic sulfide corresponding to the formula $R_5$—S—$R_6$ wherein $R_5$ and $R_6$ are alkyl or hydroxyalkyl of from 1 to 4 carbons, and wherein (3) is an organic monocarboxylic acid of from 1 to 4 carbon atoms.

15. The product defined by claim 14 wherein (2) is thiodiethanol, (3) is acetic acid, and wherein at least 0.7 equivalents of (2) and at least about 0.7 equivalents of (3) are present per vicinal epoxy group in (1) in the reaction mixture.

16. An aqueous coating composition comprising an aqueous solution or an aqueous dispersion of the product defined by claim 1.

17. An aqueous coating composition defined by claim 16 which additionally comprises a water-soluble or water-dispersible urea/formaldehyde resin, melamine/formaldehyde, imino urea/formaldehyde resin or a phenol/formaldehyde resin.

18. An aqueous coating composition comprising the product defined by claim 15 and additionally comprising hexamethoxymethylmelamine resin.

19. The aqueous coating composition defined by claim 16 which additionally comprises a polycarboxylic acid or a polycarboxylate derived from (3).

20. The aqueous coating composition defined by claim 16 which additionally comprises an acid catalyst.

21. The aqueous coating composition defined by claim 20 in which the acid catalyst is phosphoric acid, p-toluenesulfonic acid, or their ammonium salts.

22. A process for preparing the product defined by claim 1 wherein the reactants (1), (2) and (3) are reacted by contacting said reactants in an aqueous medium at a temperature of from about 35° to about 90° C.

23. The process defined by claim 22 wherein said reaction temperature is from about 60° to about 85° C.

24. The process defined by claim 22 wherein the process is conducted in the presence of a minor amount of a dispersing agent, organic cosolvent or mixtures thereof.

25. A process for preparing the product defined by claim 1 wherein the epoxy resin, (1), is reduced to a stirrable viscosity and mixed with (2) and (3) in water at a reaction temperature of from 60° to about 100° C; said water being present in the reaction mixture in amounts of from about 5 to about 50 moles of water per theoretical sulfonium moiety in the final product, based on reactants charged.

26. The process defined by claim 25 wherein said water is present in amounts of from about 10 to about 20 moles of water per theoretical sulfonium moiety.

27. The process defined by claim 26 wherein said reaction temperature is from about 70° to about 85° C.

* * * * *

UNITED STATES PATENT AND TRADEMARK OFFICE
CERTIFICATE OF CORRECTION

PATENT NO. : 4,020,030
DATED : April 26, 1977
INVENTOR(S) : Robert F. Harris and Nancy B. Tefertiller It is certified that error appears in the above-identified patent and that said Letters Patent are hereby corrected as shown below:

Column 4, line 21: "abd/or" should read --and/or--.

Column 6, line 39: "A isopropylidene" should read --A is isopropylidene--.

Column 8, lines 16 and 17: "difference" should read --different--

Column 8, line 28: "Der 661" should read --DER 661--.

Column 9, line 28: "S" should read --$S^{\oplus}$--.

Column 12, line 23, Claim 25, line 4: --about-- should be inserted between "from" and "60°".

Signed and Sealed this

Thirteenth Day of December 1977

[SEAL]

Attest:

RUTH C. MASON
Attesting Officer

LUTRELLE F. PARKER
Acting Commissioner of Patents and Trademarks